United States Patent
Persson

(10) Patent No.: US 9,027,625 B2
(45) Date of Patent: May 12, 2015

(54) DEVICE FOR PRELOADING A REWIND MECHANISM

(75) Inventor: Bo Persson, Br•kne-hoby (SE)

(73) Assignee: Markisol Holding AB, Ronneby (SE)

( * ) Notice: Subject to any disclaimer, the term of this patent is extended or adjusted under 35 U.S.C. 154(b) by 0 days.

(21) Appl. No.: 13/876,945

(22) PCT Filed: Nov. 10, 2011

(86) PCT No.: PCT/SE2011/051342
§ 371 (c)(1),
(2), (4) Date: Mar. 29, 2013

(87) PCT Pub. No.: WO2012/064270
PCT Pub. Date: May 18, 2012

(65) Prior Publication Data
US 2013/0221147 A1  Aug. 29, 2013

(30) Foreign Application Priority Data
Nov. 10, 2010 (SE) ...................................... 1051180

(51) Int. Cl.
*E06B 9/60* (2006.01)
*E06B 9/42* (2006.01)
*G03B 21/58* (2014.01)
*B65H 75/48* (2006.01)

(52) U.S. Cl.
CPC ... *E06B 9/42* (2013.01); *E06B 9/60* (2013.01); *G03B 21/58* (2013.01); *B65H 75/486* (2013.01)

(58) Field of Classification Search
USPC .......................................... 160/313, 318, 315
IPC ................................ E06B 9/60; E05C 13/1253
See application file for complete search history.

(56) References Cited

U.S. PATENT DOCUMENTS

| 2,307,095 | A | * | 1/1943 | Zaferakis | 160/263 |
| 4,429,729 | A | * | 2/1984 | Winslow | 160/315 |
| 5,271,446 | A |   | 12/1993 | Hwang | |
| 5,967,051 | A | * | 10/1999 | Ragsdale et al. | 104/60 |
| 7,967,051 | B2 | * | 6/2011 | Diaz | 160/188 |
| 8,210,230 | B2 | * | 7/2012 | Glasl | 160/318 |
| 2007/0102123 | A1 |   | 5/2007 | Kim | |

(Continued)

OTHER PUBLICATIONS

International Search Report for PCT/SE2011/051342, mailed Feb. 15, 2012; ISA/SE.

*Primary Examiner* — Blair M Johnson
(74) *Attorney, Agent, or Firm* — Harness, Dickey & Pierce, PLC

(57) ABSTRACT

The present invention concerns a device (1) for preloading of a rewind mechanism (2) for a fabric (4) arranged on an elongated tube (3) or the like of a roller blind, a projector screen or the like. The rewind mechanism (2) is arranged to be essentially inserted into said tube (3) and includes a spring (10), that is tensioned when the fabric (4) is rolled out and relieved when the fabric (4) is rolled up onto the tube (3). The device (1) includes an outer mounting element (5), that is arranged to be attached to the tube (3), and an inner mounting element (6), that is arranged to be attached to an outer bracket (not shown), said mounting elements (5, 6) being rotatingly arranged in relation to each other about a longitudinal axis of said tube (3). A spring element (7) is arranged between said mounting elements (5, 6) and includes a sleeve (11), in which said spring (10) is arranged. The sleeve (11) has an inner diameter that is smaller than the outer diameter of the spring (10) in an untensioned condition, wherein said spring (10) is arranged inside the sleeve (11) by being inserted therein in a pretensioned condition.

3 Claims, 2 Drawing Sheets

(56) References Cited

U.S. PATENT DOCUMENTS

| | | | |
|---|---|---|---|
| 2008/0073039 A1* | 3/2008 | Gyngell et al. | ............... 160/313 |
| 2009/0301534 A1 | 12/2009 | Bettega et al. | |
| 2012/0000615 A1* | 1/2012 | Lin | ............... 160/313 |
| 2013/0221147 A1* | 8/2013 | Persson | ............... 242/375.2 |

* cited by examiner

DEVICE FOR PRELOADING A REWIND MECHANISM

CROSS-REFERENCE TO RELATED APPLICATIONS

This application is a 371 U.S. National Stage of International Application No. PCT/SE2011/051342, filed on Nov. 10, 2011, which claims priority to Swedish Patent Application No. 1051180-6, filed Nov. 10, 2010, the contents of which are hereby incorporated by reference in their entirety as if fully set forth herein.

TECHNICAL FIELD

The present invention concerns a device for preloading of a rewind mechanism for a fabric arranged on an elongated tube or the like of a roller blind, a projector screen or the like, said rewind mechanism being arranged to be essentially inserted into said tube and including a spring, that is tensioned when the fabric is rolled out and is relieved when the fabric is rolled up onto the tube, said device including an outer mounting element, that is arranged to be attached to the tube, and an inner mounting element, that is arranged to be attached to an outer bracket, said mounting elements being rotatingly arranged in relation to each other about a longitudinal axis of said tube.

PRIOR ART

Rewind mechanisms of different kinds are used e.g. for roller blinds, for sun shades, for protection from public view, for displays or screens for the displaying of information from a video or overhead projector or the like, but also for advertising where the information is printed directly onto the fabric. Common to all these is that the fabric is rolled up onto a tube.

According to an embodiment of known roller blinds rewinding and rolling out of the fabric be carried out by means of a pull cord that is arranged about a pulley or the like at one end of the roller blind. This has now shown to be inappropriate because a pull chord hanging on one side of e.g. a window can be hazardous to children.

According to another embodiment of known roller blinds a spring is arranged inside a tube, wherein a fabric is rolled off the tube against the action of a spring force. When rolling out the spring is tensioned and when rewinding the spring helps to automatically roll up the fabric. This does however require that the spring is pretensioned to a certain degree.

Achieving such a pretensioning constitutes a problem, and usually pretensioning has to be done before final assembly of the tube. However, a factory-assembled spring can loose its pretensioning if the device is dropped or exposed in another way to blows or shocks. Since the pretensioning requires special tools, and requires great force too, and since the spring is difficult to come to, the device must then be resubmitted to the producer for renewed pretensioning.

SUMMARY OF THE INVENTION

The subject of the present invention is to achieve preloading of a rewind mechanism in a device, said mechanism maintaining its preloading irrespectively of the device being dropped or exposed to blows or shocks.

According to the present invention, this subject is achieved by means of a device according to the preamble, said device being characterised in that a spring element is arranged between said mounting elements, in that the spring element has a first end, that is attached in relation to the outer mounting element, and a second end, that is attached in relation to the inner mounting element, in that the spring element comprises an outer sleeve, in which said spring is arranged, in that the spring has an outer diameter that decreases when tensioning the spring, in that the outer sleeve has an inner diameter that is smaller than the outer diameter of the spring in an untensioned condition, in that the spring is arranged in an pretensioned condition to abut against the outer sleeve, in that the outer sleeve is attached to the outer mounting element, and in that the spring has one of its ends attached to the inner mounting element and its other end attached to the outer sleeve.

From the above it is evident that the spring, that is used for the device according to the invention, is of a type having an outer diameter that decreases when the spring is tensioned. This feature is used in the spring element, that includes an outer sleeve having an inner diameter that is smaller than the outer diameter of the spring in an untensioned condition. By pretensioning the spring and by arranging it in a pretensioned condition inside the sleeve, it is possible to stabilize the spring and to maintain its pretensioning, since the spring, due to the sleeve, cannot to expand to an untensioned condition. Further, according to the invention, by attaching the outer sleeve to the outer mounting element and by attaching one end of the spring to the inner mounting element and the other end thereof to the outer sleeve, the whole length of the spring can be used to pick up tension.

According to a preferred embodiment the spring has a diameter of 16 mm in an untensioned condition and the sleeve has an inner diameter of 15 mm. Thereby the device can be used for the usually occurring dimensions of rollup tubes that today are on the market. It is also possible to adjust the pretensioning by choosing different interior diameters for the sleeve or different outer diameters for the spring.

BRIEF DESCRIPTION OF THE DRAWINGS

In the following the invention will be described in greater detail with reference being had to the enclosed drawings that illustrate an example of a currently preferred embodiment of the invention.

DESCRIPTION OF PREFERRED EMBODIMENTS

Figure 1:
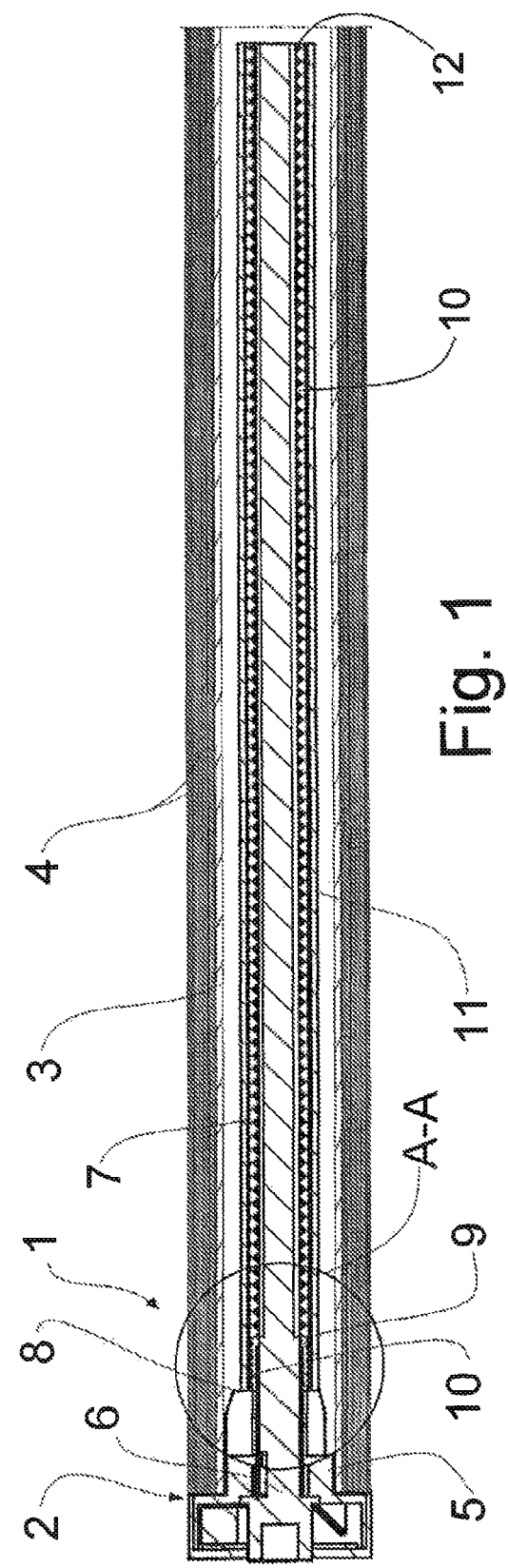
FIG. 1 shows a sectional view of a rewind mechanism according to the invention arranged at an end of a roller blind.

In FIG. 1 a device 1 is shown for preloading of a rewind mechanism 2 for a fabric 4 arranged on an elongated tube 3 or the like of a roller blind, a projector screen or the like. The rewind mechanism 2 is arranged to be essentially inserted into the tube 3 as a unit, preferably at one end of the tube. Thus one and same type of rewind mechanism 2 can be used for tubes 3 of different lengths.

The rewind mechanism 2 comprises an outer mounting element 5, that is arranged to be attached the outer tube 3. This can be done in a known manner by producing the outer mounting element 5 of plastic and by providing it with protrusions which are forced to abut against the tube 3, which appropriately is made of metal or rigid plastic.

The rewind mechanism 2 also comprises an inner mounting element 6, that is arranged to be attached to an outer bracket (not shown), that in a known manner can comprise a square protrusion that projects into a corresponding recess of the inner mounting element 6. Of course, the protrusion also can be arranged on the inner mounting element 5 and the recess in the outer bracket.

Figure 2:
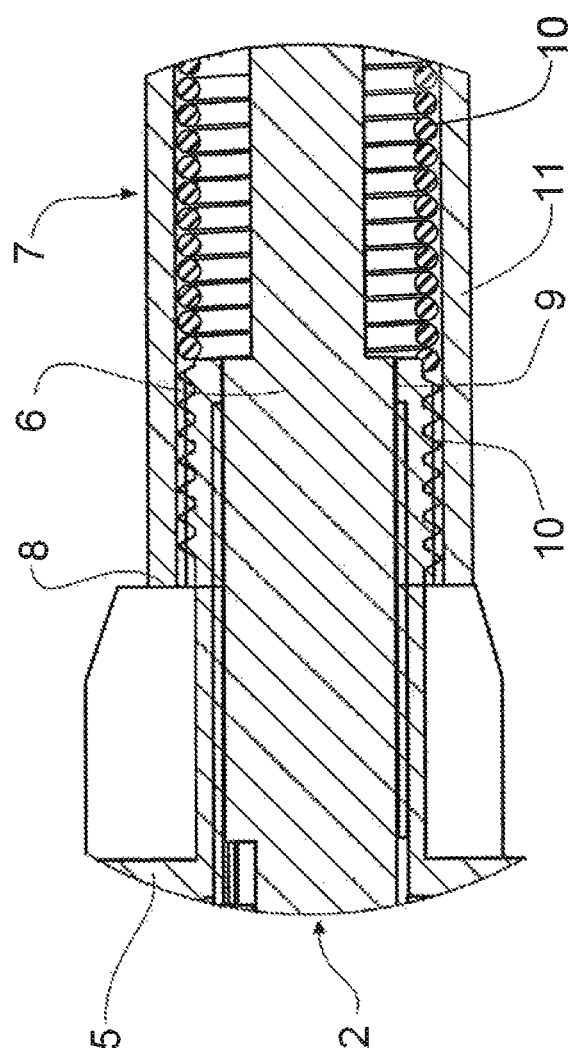
FIG. 2 shows a magnified detailed view of the rewind mechanism according to the area A-A of FIG. 1.

As evident from FIG. 1 and shown in more detail in FIG. 2, the mounting elements 5 and 6 are rotatingly arranged in relation to each other about a longitudinal axis of the tube, wherein a spring element 7 is arranged between said mounting elements 5 and 6, having a first end 8 attached in relation to the outer mounting element 5 and a second end 9 attached in relation to the inner mounting element 6. The spring element 7 comprises a spring 10 that is tensioned when the fabric 4 is rolled out and relieved when the fabric 4 is rolled up onto the tube 3. The spring 10 is constituted especially of a so-called torsion spring, which is tensioned by being twisted a number of turns, e.g. between 10 and 30 turns, and which in a pretensioned condition is fixed by the spring element 7. This fixation can be carried out in various ways, and preferably the spring element 7 comprises an outer sleeve 11 and a spring 10 arranged inside of the sleeve 11. The outer sleeve 11 can comprise a tube of plastic or metal, but can also comprise a netting, longitudinal battens or some kind of windings around the spring 10, that secures the same. The spring 10 has an outer diameter that decreases when tensioning the spring 10, wherein the outer sleeve 11 has an inner diameter that is smaller than the outer diameter of the spring 10 in an untensioned condition. The spring 10 is arranged inside the outer sleeve 11 in a pretensioned condition.

The outer sleeve 11 is connected to the outer mounting element 5 and the spring 10 has one of its ends connected to the inner mounting element 6 (at 12) and its other end connected to the outer sleeve 11 (at 8). Thus the spring 10 abuts the outer sleeve 11 in a pretensioned condition. It is essential for the invention that the spring 10 is prevented from returning to its initial dimension in an untensioned condition. According to a preferred embodiment of the invention the spring has a diameter of 16 mm in an untensioned condition and the sleeve 11 an inner diameter of 15 mm. It is also possible to control pretensioning by choosing other inner diameters of the sleeve 11 or other outer diameters of the spring 10.

It is obvious that the described embodiment of the invention can be varied in different ways within the scope of the invention as defined in the appendant claims.

The invention claimed is:

1. A device for preloading of a rewind mechanism for a fabric arranged on an elongated tube of a roller blind or a projector screen, said rewind mechanism being arranged to be inserted into said tube and including a spring, that is tensioned when the fabric is rolled out and is relieved when the fabric is rolled up onto the tube, said device including an outer mounting element, that is arranged to be attached to the tube, and an inner mounting element, that is arranged to be attached to an outer bracket, said mounting elements being rotatingly arranged in relation to each other about a longitudinal axis of said tube, wherein a spring element is arranged between said mounting elements, wherein the spring element has a first end that is attached in relation to the outer mounting element, and a second end that is attached in relation to the inner mounting element, wherein the spring element includes an outer sleeve in which an entirety of said spring is arranged, wherein the spring has an outer diameter that decreases when tensioning the spring, wherein the outer sleeve has an inner diameter that is smaller than the outer diameter of the spring in an untensioned condition, wherein the spring is arranged in a pretensioned condition to abut against the outer sleeve, wherein the outer sleeve is attached to the outer mounting element, and wherein the spring has one of its ends attached to the inner mounting element and the other end attached to the outer sleeve.

2. The device according to claim 1, wherein said spring has a diameter of 16 mm in an untensioned condition and wherein said sleeve has an inner diameter of 15 mm.

3. The device according to claim 1, wherein the spring includes a plurality of coils, and wherein all of the coils are temporarily deactivated and then gradually activated by contraction of the spring.

* * * * *